United States Patent Office 3,306,907
Patented Feb. 28, 1967

3,306,907
PROCESS FOR PREPARING N₁,N₅-DI(POLY-
BUTENYLSUCCINIMIDE)
Herbert A. McNinch, Portage, and Robert E. Karll,
Munster, Ind., assignors to Standard Oil Company,
Chicago, Ill., a corporation of Indiana
No Drawing. Filed Apr. 29, 1963, Ser. No. 276,217
3 Claims. (Cl. 260—326.3)

This application is a continuation-in-part of application Ser. No. 168,537, filed January 24, 1962, and now abandoned.

This invention relates to detergent additives for lubricant oils and more particularly pertains to disuccinimide derivatives of tetraethylene pentamine, their preparation as a concentrate and their use in lubricant oil compositions.

We have discovered an outstanding detergent-dispersant for lubricating oils whose active detergent-dispersant consists essentially of a di(alkenylsuccinimide) of tetraethylene pentamine (commercially available tetraethylene pentamine compositions containing primarily tetraethylene pentamine) which active detergent-dispersant disuccinimide can be illustrated by the general formula:

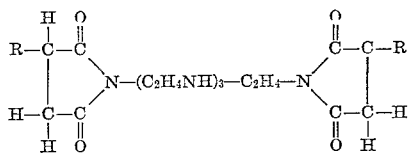

wherein R is an alkenyl or alkyl group derived from polybutene of an average molecular weight in the range of from 500 to 100,000. The foregoing active detergent-dispersant disuccinimides can be named as $N_1,N_5$-di-(alkenylsuccinimide) of tetraethylene pentamine. This active detergent-dispersant disuccinimide is prepared by first reacting a polybutene with maleic anhydride under conditions hereinafter described to maximize utilization of maleic anhydride to form a 3-polybutenyl succinic anhydride. In general, an excess of polybutene is employed for reasons hereinafter appearing and the reaction is also carried out in the presence of a small amount of a light hydrocarbon oil diluent, such as a solvent extracted SAE 5W oil, to reduce the viscosity of the final composition to facilitate filtration. The reaction is carried out under an inert gas atmosphere, e.g., nitrogen atmosphere. After filtration to remove undissolved reaction by-products, the solution of polybutenyl succinic anhydride is reacted with commercial tetraethylene pentamine to obtain a solution of the active detergent-dispersant hereinbefore illustrated. It will be understood that there can be present in the solution disuccinimides of the type hereinbefore illustrated by the general formula modified by the presence of amide groups derived from the reaction of polybutenylsuccinic anhydride with a secondary amino group. The presence of such amide groups is detected as trace amounts only by rather precise infra-red determinations and appear as irregularities in otherwise smooth peak identification curves. Dilution of the final product with a light hydrocarbon oil, e.g., solvent extracted SAE 5W oil, to provide a concentrate of desired active detergent-dispersant content, 40 to 50% by volume is desirable to provide a product of suitable viscosity characteristics for further handling and/or packaging.

It is known that 3-alkyl or alkenyl-substituted succinic anhydrides containing 5 to 20 carbon atoms in the alkyl or alkenyl groups are corrosion inhibitors in lubricating oils and greases. It is also known that monoamine reaction products of such alkyl or alkenyl succinic anhydrides are also corrosion inhibitor additives for lubricating oil and greases. It has become recently known, from French Patent 1,254,094, that mono- and di-amide derivatives of polyamines, such as the "ethylene amines" of the class corresponding to the formula

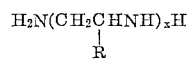

derived from ethylene dichloride and ammonia, reacted with aliphatic-substituted succinic acid or anhydride where the aliphatic group contains 50 or more carbon atoms possess detergent properties useful in lubricant oil compositions for internal combustion engines. It has also recently become known, from French Patent 1,265,086, that monosuccinimides of tetraethylene pentamine obtained from 3-alkenylsuccinic anhydride having 30 to 200 carbon atoms in the alkenyl group possess detergency properties useful in lubricant oil compositions for internal combustion engines.

The alkylsuccinnic anhydride-polyamine detergency derivatives of both the foregoing French patents have several characteristics in common. They both are indicated as having a number of free secondary amino groups and they both contain long chain hydrocarbon substituents in the 3 or 4 position of the succinic anhydride ring moiety. The products of both patents are obtained by reacting long chain hydrocarbons with maleic anhydride at elevated temperatures in the range of 300 to 450° F. in varying ratios of hydrocarbon to anhydride to produce the alkyl or alkenyl succinic anhydride which is then reacted with the polyamine or tetraethylene pentamine at temperatures above 175° F., generally in the range of 200 to 320° F. or higher up to as high at 500° F. with the removal of water of reaction and reaction diluent, such as toluene, if used.

French Patent 1,254,094 characterizes the products obtained by the reaction of the ethylene amines with aliphatic-substituted succinic anhydride or the corresponding acids as reaction products containing simple acyclic diamides, cyclic diamides, or a polymeric amide (the substituted succinic anhydride or acid being an open chain unit of the polyamide). These amide products are said to be formed by the acylation of the polyamine with the aliphatic substituted succinic anhydrides or acids. Through a reaction differing in kind from said acylation reaction, this French patent suggests that a certain amount of imide formation will occur but does not specify to what extent imide formation occurs. Thus, the reaction mixture of French Patent 1,254,094 is said to contain a mixture of undefined acyclic diamides, cyclic diamides, polyamides and perhaps some imides. Yet the reaction mixture does, from the data presented, possess detergency properties.

French Patent 1,265,086, on the other hand, is quite specific with respect to characterizing the hydrocarbon-maleic anhydride-tetraethylene pentamine reaction product as a mono(alkenylsuccinimide) of tetraethylene pentamine having three free secondary amino groups and one free primary amino group wherein the alkenyl group substituent on the succinimide ring contains 30 to 200 carbon atoms. These monosuccinimides of tetraethylene pentamine are also lubricant oil detergents as the data demonstrates.

As both French patents point out the operation of the present day internal combustion engines in automobiles, delivery trucks, taxicabs, police cars, etc. in so-called stop and go city use results in the accumulation of water and partial combustion products in the crankcase of the engines of such vehicles which lead to sludge formation. Such sludge deposits in and on the valve train, pistons and piston rings, oil screens and filters. Partial oxidation products deposited on hot metal surfaces form varnishes which also impair efficient operation of the engine. While solutions to these city driving conditions have been sought, there had to be kept in mind that any detergent or dispersant which would keep water, sludge and varnish-forming materials suspended or dispersed must be thermally stable at the high temperatures of continuous use under high speed highway and expressway driving conditions so that the detergent and/or dispersant additive would be effective after high temperature operation for subsequent stop-start city driving.

A detergent or dispersant for use in water-in-oil emulsions or dispersions must have a hydrophylic group having an affinity for water or soluble in water and a hydrophobic group soluble in the oil or non-water phase. Now it is abundantly clear that the 3-alkyl or alkenyl substituent in the diamide-polyamide mixture of French Patent 1,254,094 and in the monosuccinimide of French Patent 1,265,086 provides the oil-soluble hydrophobic group. It is equally clear that the secondary amino groups and primary amino groups of the acyclic diamide-cyclic diamide-polyamide mixture of French Patent 1,254,094 and the three free secondary amino groups and one free primary amino group of the monosuccinimide of French Patent 1,265,086 provide the hydrophylic group necessary for dispersing or emulsifying the water in the oil base of the lubricant. In each detergent composition there appears to have been provided the necessary balance of hydrophylic and hydrophobic groups.

From the foregoing consideration of the lubricant oil detergents of the two French patents it would appear that the balance of hydrophylic and hydrophobic groups might be upset by the formation of a disuccinimide of tetraethylene pentamine, such as illustrated by the general formula:

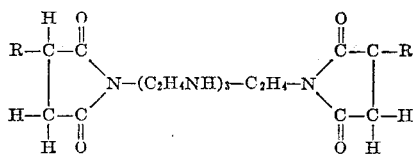

wherein R is an alkenyl or alkyl group derived from polybutene of an average molecular weight in the range of from 500 to 100,000. The two large R groups on the rings of the succinimide groups on the $N_1, N_5$ terminal nitrogens originating from the terminal primary amino groups of tetraethylene pentamine might have been thought to upset the hydrophylic-hydrophobic balance. However, we have found this not to occur but, rather surprisingly, the disuccinimides have somewhat enhanced detergency properties when incorporated in a lubricant oil composition. The indicated disuccinimides of tetraethylene pentamine demonstrate an enhanced capacity to prevent sludge deposit and varnish formation and thus, demonstrate a greater detergency capacity to keep water, partial oxidation products and other sludge and varnish formers in suspension or emulsion.

The foregoing can be demonstrated by a comparison of the use of lubricant oils in Lincoln M. S. Sequence V test procedure devised by Ford Motor Company. The Lincoln sequence tests procedure evaluates low temperature dispersancy characteristics of a lubricating oil. Briefly, the test consists of using the oil to be tested as a lubricating oil in a V-8 Lincoln engine under prescribed test conditions. Accordingly, 5 quarts of oil are placed in the crankcase and the engine is started and run in accordance with the 4-hour cycle:

|  | Phase 1 | Phase 2 | Phase 3 |
|---|---|---|---|
| Duration | 45 min | 2 hr | 75 min. |
| Speed, r.p.m | 500 | 2,500 | 2,500. |
| Load, lbs | No Load | —(105 H.P.) | —(105 H.P.) |
| Temperature, ° F.: |  |  |  |
| Water Out | 115–120 | 125–130 | 170–175. |
| Oil Sump | 120–125 | 175–180 | 205–210. |
| A/F | 9.5±0.5 | 15.5±0.5 | 15.5±0.5. |

The 4-hour cycle is reset a total of 48 times (192 hours running time). After each 16 hours of operation the engine is shut down for 8 hours. Two-ounce samples of oil are taken every 30 hours and the oil level is adjusted with fresh oil to a level of 5 quarts. Added oil is weighed. At the termination of the test, the hot oil is drained, measured and recorded. The engine is then disassembled and examined for deposits of varnish and sludge among other observable results as set out in Table I below.

The lubricant oils employed in the foregoing Lincoln M. S. Test Sequence V procedure contained a base oil with 1.2 weight percent of a zinc dialkldithiophosphate anti-oxidant wherein the alkyl groups are derived from isopropanol and oxo-octanol. In addition the lubricant oils contained detergent "A," a solution of acyclic diamide-cyclic diamide-polyamide (derived from polybutene, maleic anhydride and a polyamine of the ethylene amines class) dissolved in polybutene of an average molecular weight of about 860 and corresponding to the polybutene reactant, or a solution of disuccinimide detergent of the class hereinbefore illustrated wherein the R groups were derived from a polybutene of an average molecular weight of about 860. The polybutene solution of detergent "A" contains about 65 volume percent of detergent "A" mixture and the polybutene solution of disuccinimide detergent contained about 45 volume percent thereof.

Two sets of tests were conducted. In one set of tests the base oil is an SAE 20–5W multi-grade base oil stock used in premium lubricant oil blends. In the other set of tests the base oil stock was a solvent-extracted SAE 20, such as used in an initial fill oil. The first oil formulation is therefore referred to as "Premium" and the second is referred to as "Initial Fill" in Table I. After the Lincoln test engines are disassembled and all parts examined after each test, the sludge and varnish ratings are made on a scale of 0 to 10 for each part (10 represents no sludge or varnish and 0 represents complete coverage with sludge or varnish) by comparison to pictorial standards for values of from 0 to 10. The importance of the sludge and varnish ratings is derived from total sludge and total varnish which will be hereinafter more fully explained in connection with other Lincoln M. S. Sequence V tests. Also shown in Table I are the amounts of solution of detergent "A" and solution of disuccinimide employed in the oil formulation.

TABLE I.—LINCOLN M.S. SEQUENCE V TEST RESULTS

| Lubricant Oil | Detergent | Amount | Total Sludge | Total Varnish | Oil Rings Stuck |
|---|---|---|---|---|---|
| Premium | "A" | 4 vol percent | 42.6 | 35.1 | |
| Do | Disuccinimide | 6 vol. percent | 45.9 | 37.9 | |
| Initial Fill | "A" | 4 vol. percent | 39.6 | 39.1 | |
| Do | Disuccinimide | 5 vol. percent | 45.2 | 41.4 | |

When it is considered that the highest total sludge and highest total varnish ratings (all parts examined are clean) are ratings of 50 for each total sludge or varnish ratings, it will be appreciated that the disuccinimide detergent in the test using "Premium" oil base stock achieves about 45% of the difference between the 42.6 total sludge rating and the 50 perfect rating not achieved by detergent "A." Such an improvement in trying to attain as near the perfect rating of 50 as is possible is a substantial advance. This is not to indicate that detergent "A" is not an above average detergent, for its detergency properties are readily apparent when it is considered that a Lincoln M. S. Sequence V total sludge rating of 25 is considered passing and a rating of 40 is required for the recommendations recently adopted for premium oils. Considering in the same manner, the "Initial Fill" oils (here 25 is passing for total sludge since the initial fill lubricant oil is not expected to have longer engine service) the oil formulated with the disuccinimide detergent achieves about 53% of the difference between the perfect 50 and 39.6 rating.

To achieve a better "excellent" detergent from the same starting reactants under substantially the same conditions of reaction temperature and yet differing in kind by upsetting what would be expected as a balance of hydrophylic to hydrophobic groups and establishing another and different relationship of hydrophylic to hydrophobic groups is accomplished in a particular manner of conducting the two reactions involved to form the succinimide. We indicated in our copending application Ser. No. 168,537, filed January 24, 1962, of which this is a continuation-in-part, that we preferred to react the polybutenyl succinic anhydride and tetraethylene pentamine in mole ratios of from 0.5 to 1.0 mole of the polyamine per mole of the substituted succinic anhydride. We also preferred to add the polyamine slowly, 0.5 to 10 hours addition time, while employing reaction temperatures sufficiently high to drive off water of reaction. Although we had appreciated that from 0.1 to 2 moles of tetraethylene per mole of polybutenylsuccinic anhydride could be reacted to form products displaying detergency in lubricating oils, we believed that it was essential for an outstanding detergent of an "excellent" rating to have a high ratio of amide to imide groups. However, as the data in the hereinbefore appearing Table I indicates, the high amide to imide ratio is not the only hydrophylic group distribution which provides a detergent of "excellent" rating. It is apparent that a detergent which contains substantially only di-imide groups and no appreciably detectable amount of amide groups, except a rather low percentage of amide groups derived from the secondary amino groups, is a superior detergent and dispersant of the "excellent" rating class.

Such a disuccinimide of tetraethylene pentamine is prepared, according to this invention, as a solution of the di-imide product in a solvent comprising a mixture of light hydrocarbon oil and the polybutene which was provided to react with maleic anhydride to prepare the polybutenylsuccinic anhydride. The use of an excess of polybutene reactant not only provides an excellent reaction diluent but also when the unreacted polybutene is incorporated into a lubricant oil composition to add the detergent, the unreacted polybutene imparts desirable viscosity index improvement. For efficiency of productivity of reaction equipment and to provide a first reaction product, polybutenylsuccinic anhydride dissolved in polybutene and oil, which can be readily filtered, it is preferred to use not more than about 0.7 to 0.9 mole of maleic anhydride per mole of polybutene. The amount of light hydrocarbon oil, preferably SAE 5W oil used as a diluent and co-solvent for the polybutenylsuccinic anhydride, is from 3.5 to 4.5 gallons per mole of maleic anhydride or 25 to 32 weight percent base on maleic anhydride.

The polybutene reacts with maleic anhydride not in the manner of a Diels-Alder reaction because of the lack of favorable unsaturation in the polybutene but rather by means of reactive hydrogen in the polybutene. This reaction occurs at elevated temperature in the range of from 300 to 500° F. The higher temperatures in this range, although increasing reaction rate, also promote thermal decomposition of maleic anhydride resulting in the formation of not only decomposition products of lower molecular weight and lower vapor pressure than maleic anhydride but also higher molecular weight products of molecular weight greater than that of maleic anhydride. Thus, when all the maleic anhydride reactant is added to the polybutene at or near the usually preferred reaction temperature of about 425 to 475° F., a substantial proportion, 3 to 10%, of the maleic anhydride undergoes thermal decomposition. The thermal decomposition is also promoted by various forms of iron such as iron-containing alloys.

One feature of our invention is the discovery that thermal decomposition of maleic anhydride can be greatly reduced by the slow addition of molten maleic anhydride (M.P. reported variously in the range of 53 to 60° C.) in admixture with 3.5–4.5 gallons of SAE 5W oil per mole of anhydride suitably at 150 to 450° F., preferably 200 to 300° F., to polybutene heated to 425 to 475° F. The oil-anhydride mixture, polybutene and reaction mixture are kept under an inert atmosphere. The addition of maleic anhydride above its melting point should be at a rate to provide no substantial unreacted maleic anhydride at any time during its addition. A suitable rate of addition is 0.1 to 0.4 mole per hour. To prevent hydrolysis of the anhydride reactant as well as the substituted anhydride product, the reaction is conducted in the absence of moisture as well as in the absence of oxygen. Exclusion of oxygen is, of course, necessitated by the hazards associated with high temperature of operation with both maleic anhydride and the polybutene.

Hence, the reaction is conducted in a closed system or a reactor open only to a reflux condensing system. It is advantageous to blanket the reaction with an inert gas, e.g. nitrogen. The rate of maleic anhydride addition to prevent accumulation of unreacted maleic anhydride can be readily determined with respect to its appearance in vapors or reflux liquids. Thus, the maximum rate of molten maleic anhydride addition is just below that at which maleic anhydride refluxes vigorously.

Maleic anhydride is reported as boiling at 202° C. (196° C.) at corrected atmospheric pressure (760 mm. Hg). Thus, reaction temperatures in the range of 425 to 475° F. are above the normal boiling point of maleic anhydride at atmospheric pressure. However, at these reaction temperatures, the rate of reaction of maleic anhydride is sufficiently fast to permit as the maximum rate of addition (no violently refluxing maleic anhydride) a commercially feasible rate of addition. To enhance contact between liquid oil-maleic anhydride mixture and the polybutene, it is desired to add the oil-maleic anhydride mixture while intimately mixing the reactants and preferably with stirring or agitation to produce a vortex beneath the stirring or agitation means and adding the oil-maleic anhydride mixture to the eye of the vortex. By the use of the foregoing techniques the utilization of added maleic anhydride in the formation of mono-(polybutenyl)substituted succinic anhydride can be maximized and the thermal decomposition of maleic anhydride can be minimized to less than 10%, even at 450 to 475° F. Actually 90 percent or more of the added maleic anhydride can be utilized in preparing the mono-(polybutenyl) succinic anhydride with the remaining 10 percent or less mainly being recoverable as unreacted maleic anhydride.

It is advantageous not to convert all the polybutene to mono-(polybutenyl)succinic anhydride for such a product is highly viscous at 425 to 450° F. and makes exceedingly difficult the removal of unreacted maleic anhydride, lighter decomposition products and heavier decomposition products. The lighter decomposition products, as well as unreacted maleic anhydride, can be readily removed by distillation of the reaction mixture at atmospheric pressure or reduced pressure or by stripping the reaction mixture with inert gas, e.g. nitrogen at reaction temperature and atmospheric pressure. The higher boiling maleic anhydride decomposition products, which may even be undesirable condensation products, can be readily removed by filtration. It is therefore preferred to employ between 0.7 to 0.9 mole maleic anhydride per mole of polybutene. The lower range of mole ratio of maleic anhydride to polybutene is governed by economics of utilization of reactor capacity, as well as by the desired concentration of the final disuccinimide product in polybutene and the amount of polybutene that can be tolerated in the final lubricant oil formulation for which it is intended. Although as low as 0.5 mole of maleic anhydride per mole of polybutene can be used, such amounts between 0.5 and 0.7 mole will be the lower limit, both with respect to efficient use of reactor capacity and final concentration. We prefer to use not less than about 0.7 mole maleic anhydride per mole of polybutene.

The reaction mixture is held at reaction temperature to insure maximum reactive utilization of maleic anhydride, generally a total of 5 to 30 hours, preferably 12 to 17 hours, including maleic anhydride addition time, will be sufficient.

For the subsequent reaction between tetraethylene pentamine and polybutenylsuccinic anhydride it is desirable to dilute the mixture containing polybutenylsuccinic anhydride (PSA) with light hydrocarbon oil, e.g. solvent extracted SAE 5W oil, to a PSA content of 50 to 60 percent by volume. For example, where the PSA content of the reaction mixture is above 60 percent from a polybutene having a 210° F. viscosity of 1000 SSU, dilution to 50 to 60% PSA is desirable and to 60% is preferred. This dilution can be effected before, during or after filtration of the PSA solution prepared by the foregoing process. It is preferred to add the diluting light hydrocarbon oil before or during filtration.

With respect to the polybutene reactant, it can be derived from n-butene, isobutene, mixtures thereof and mixtures containing n-butene and isobutene. It is desired that the polybutene have an ebullioscopic molecular weight of at least 500 up to 100,000 or more. Preferred polybutenes are those having an average ebullioscopic molecular weight in the range of 700 to 2,000 and a viscosity in the range of 1,000 to 15,000 SSU at 210° F. The polybutene may contain polymers of lower molecular weight such as those having average molecular weights of 300 to 500. Since the polybutene may not be a completely saturated compound, the substituent on the succinic anhydride ring is referred to herein and in the claims as "polybutenyl."

The foregoing preparation of the mono-(polybutenyl) succinic anhydride is also believed to aid in the preparation of the disuccinimide of the demonstrated superior "excellent" detergency rating. The reaction of the tetraethylene pentamine with mono-(polybutenyl)succinic anhydride is conducted at a temperature sufficiently high to promote imidization and remove water of reaction. Again oxidation conditions are undesirable and an inert reaction atmosphere, preferably nitrogen, is employed. Injecting nitrogen into the liquid reaction mixture aids in the removal of water of reaction from the relatively viscous reaction mixture. It is known that the primary amino groups, and to a lesser extent the secondary amino groups, will open the anhydride ring to form a mono-acid amide without the formation of water through acylation of the polyamine and especially when all of the polyamine is added at one time. The mono-acid amide of succinic acid, upon further heating above 220° F., will undergo cyclization to form a succinimide. However, it is believed that our discovery of adding tetraethylene pentamine in the mole ratio of from 0.4 to 0.6, preferably 0.5 mole, per mole of mono-(polybutenyl)succinic anhydride at such a rate as to prevent the presence or accumulation of mono-acid-amides or di-amides and at or above the temperature at which cyclization of mono-acid-amide occurs, solved di-(monopolybutenylsuccinimide) of tetraethylene pentamine mainly forms as the reaction product. Infrared analysis of mono-(polybutenyl)succinic anhydridetetraethylene pentamine reaction products prepared in this way comprise as the active detergent-dispersant essentially a disuccinimide product of the formula hereinbefore presented substantially free from amide groups. The most preferred technique is to add about one-half of the tetraethylene pentamine over about 30 to 45 minutes to the solution of amino-(polybutenyl)succinic anhydride at about 230 to 250, preferably at 240° F. and permit the heat of reaction to bring the reaction to about 250–280° F., preferably 280° F., while removing water of reaction. Thereafter at the higher temperature the remainder of the tetraethylene pentamine is added over 60 to 90 minutes while permitting the reaction temperature to increase to about 300° F. and while removing water of reaction. The total addition time is 1.0 to 1.5 hours. The resulting mixture, after the addition of all the tetraethylene pentamine, is held at 270 to 300° F. until substantially all the water of reaction is removed. The injection of nitrogen into the reaction mixture not only provides the inert reaction atmosphere but also aids in stripping out the water of reaction.

The foregoing reaction mixture contains mainly dissolved di-(monopolybutenylsuccinimide) of tetraethylene pentamine, $N_1,N_5$-di-(monopolybutenylsuccinimide) tetraethylene pentamine. The polybutenyl group is on the carbon in either the 3 or 4 position in the succinimide ring. The disuccinimide content of the solution can vary depending on the use of maleic anhydride within the 0.5 to 0.9 mole ratio and the molecular weight of the polybutene employed.

The process for preparing $N_1,N_5$-di-(monopolybutenylsuccinimide) tetraethylene pentamines dissolved in polybutene is exemplified by the following preparations for a more complete understanding of the process and products of this invention.

TWO PREPARATIONS OF MONOPOLYBUTENYLSUCCINIC ANHYDRIDE

A quantity of polybutene, 12,700 pounds to each reactor, having an average molecular weight of about 860 and a viscosity of 1000 SSU at 210° F. is heated to about 450° F. in an inert atmosphere reaction vessel closed to the atmosphere but open to a reflux condenser which is open to atmospheric pressure. The reaction vessel also has a stirrer, means for heating and cooling and means for introducing nitrogen. While vigorously stirring the hot polybutene, there is added about 0.75 and 1.0 mole respectively of maleic anhydride at 200° F. to 250° F. per mole of polybutene at the rate of 0.2 to 0.3 mole per hour to the stirred hot polybutene. After all the maleic anhydride is added, the resulting mixture is held at about 440 to 450° F. The total reaction time is about 18 hours in each reactor. Thereafter unreacted maleic anhydride and materials boiling lower than maleic anhydride are removed from each reaction mixture injecting nitrogen into the reaction mixture for about 2 hours and operating the reflux condenser as a hot condenser at a temperature of about 400° F. and collecting condensable components from the resulting gasiform mixture. The product is withdrawn and combined with filter aid and a quantity of solvent extracted SAE 5W oil to obtain a polybutenylsuccinic anhydride concentration of 48.5% by weight and filtered through a Sparkler filter. The monopolybutenylsuccinic anhydride is found to have a molecular weight of about 960. Of the maleic anhydride charged, about 90% is accounted for in the substituted succinic anhydride product produced from the 0.75 mole ratio and only 85% in the product from the 1.0 mole maleic per mole polybutene reaction.

*Preparation of disuccinimide—No. 1*

There is employed a reactor fitted with a stirrer, a reflux condenser, means for cooling and heating the reactor contents, means for stirring the reaction mixture and means for injecting nitrogen into the reaction mixture. To this reaction vessel, purged of air with nitrogen, there is charged 16,720 pounds of the foregoing solution containing 48.5% polybutylene succinic anhydride cooled to about 220 to 240° F. There is first added over a 30 minute period about 0.3 mole of tetraethylene pentamine per mole of polybutenylsuccinic anhydride in the solution with stirring and with the reflux condenser operating at a minimum temperature of 220° F. to permit removal of water of reaction which is downstream of the reflux condenser. Water of reaction is removed and the temperature of the reaction mixture increases by heat of reaction to 250 to 270° F. in this 30 minute period of polyamine addition. Thereafter there is added an additional 0.3 mole tetraethylene pentamine per mole of polybutenylsuccinic anhydride in the solution as charged and the polyamine is added at a rate to maintain a maximum reaction temperature of about 330° F., total time of 60 minutes for the second polyamine addition. Again water of reaction is removed during the polyamine addition. The reaction mixture is held at about 330° F. with injection of nitrogen into the hot reaction mixture to facilitate removal of water of reaction. When no further water of reaction comes off, the reaction mixture is diluted to 45% disuccinimide with solvent extracted SAE 5W oil, filtered, and is cooled to ambient room temperature.

The product made in the foregoing manner is found to have an acidity of 2.8 (mg. KOH/gram), and a nitrogen content of 1.53 percent. By infra-red analysis of this reaction product, there is identified in the structure of a compound groups whose characteristics identify them as consisting essentially of disuccinimide groups, substantially no groups having the characteristics of amide groups, and groups characteristic of the polybutene substituent. Although the peak characteristic of the succinimide group had slight irregularities, such slight irregularities were of a magnitude, if representing amide groups, as to amount to not more than a trace of amide which may have been present from side reaction involving any one of the secondary amino groups. Consequently, the dissolved product consists essentially of $N_1$, $N_5$-di-(monopolybutenylsuccinimide) of tetraethylene diamine.

*Preparation of disuccinimide—No. 2*

The process of "Preparation of disuccinimide—No. 1" is repeated except a total amount of 0.5 mole tetraethylene pentamine is added in 2 hours instead of 1.5 hours for 0.6 mole per mole of polybutenylsuccinic anhydride in the 48.5% solution thereof. The resulting product also consists essentially of the di-(monopolybutenylsuccinimide) of tetraethylene pentamine dissolved in polybutene and the 5W oil in an amount of about 45 weight percent. This product has an acidity of 3.4 mg. KOH/gram, and a nitrogen content of 1.39 percent.

The same product may be prepared by adding first 60% of the polyamine (0.3 mole per mole of polybutenylsuccinic anhydride) in about 30 minutes and the remaining 0.2 mole polyamine per mole of the original substitute succinic anhydride in about 30 to 60 minutes to achieve the 330° F. final reaction temperature.

*Preparation of disuccinimide—No. 3*

The "Preparation of disuccinimide—No. 1" is repeated by adding the 0.3 mole tetraethylene pentamine per mole of polybutenylsuccinic anhydride (48.5%) dissolved in polybutene-oil of average molecular weight of 860. Then there is added only 0.1 mole tetraethylene pentamine per mole of original polybutenylsuccinic anhydride in solution. This second addition is made sufficiently rapid to achieve the 330° F. final reaction temperature with the minimum amount of externally added heat. The finished product contains 1.12% nitrogen, has an acidity of 6.2 mg. KOH/gram, and, from infra-red analysis, contains the characteristics of the disuccinimide with substantially more amide interference probably from secondary amino group reactions.

*Preparation of disuccinimide—No. 4*

A heated vessel is charged under an inert atmosphere with 40 gallons of solvent extracted SAE 5W base oil and 1250 pounds of maleic anhydride from 50 pound bags. The maleic anhydride is melted and heated to 250° F. under an inert atmosphere. A reactor having a reflux condenser is charged with 1710 gallons (12,700 pounds) of H–100 polybutene (210° F. viscosity of 1000 S.S.U.) previously blown with inert gas ($N_2$) while heating to 450° F. During reaction an inert atmosphere is maintained. The maleic anhydride is transferred to the reactor over a period of 3 to 4 hours. The temperature in the reactor is held at 440–450° F. After 14 hours reaction including maleic anhydride addition time, the reaction mixture is blown vigorous with inert gas for 2 hours to strip out unreacted maleic anhydride. The stripped mixture is mixed with 25 pounds of filter aid, diluted to 48.5% PSA with solvent extratcted SAE 5W base oil (250–280 gallons), and pumped through a Sparkler filter at 300–350° F.

A second reactor is charged with 2200 gallons (16,720 pounds) of the filtered 48.5% active PSA under an inert atmosphere. The temperature is adjusted to 220–240° F., and 1 pint of a silicone anti-foam fluid is added. Tetraethylpentamine (800 pounds, 96.5 gallons) is added over a period of 2 hours, allowing the temperature to rise to 300° F. One hour after the addition is completed the neutralization mixture is blown with inert gas for 2 hours. The neutralized mixture is diluted to 45% active with 265 gallons of solvent extracted SAE 5W base oil, and filtered through a Sparkler to product storage.

With the process described above the yields of PSA, based on polymer, are consistently at 65% or better. Further, because maleic anhydride decomposition products have been minimized to about 5% of maleic anhydride charged, filtration problems have been eliminated.

The foregoing disuccinimide product when diluted with solvent extracted SAE 5W oil to 45% active detergent-dispersant has a 210° F. viscosity of 443 SSU, an acid number (mg. KOH/gram) of 3.0 and 1.29% nitrogen.

*Preparations of disuccinimide—Nos. 4 to 6*

The process of "Preparations of disuccinimide No. 3" is repeated using the same polybutene (210° F. viscosity of 1000 SSU) but with different molar ratios of maleic anhydride to polybutene (MA/PB) and different temperatures for the oil-maleic anhydride mixture reaction. Otherwise the time for oil-maleic anhydride addition is 4 hours, the reaction time is 14 hours, the PSA reaction product is stripped of unreacted maleic anhydride with nitrogen for 2 hours and is filtered as described, the solution of PSA is reacted with 0.5 pound mole tetraethylenepentamine (TEPA) per pound mole PSA by adding the polyamine over a two hour period with a maximum temperature of about 330° F., water is stripped out with inert gas injection for 2 hours and the neutralized product is diluted to 45% disuccinimide with solvent extracted SAE 5W oil. These preparations are summarized in Table II below.

additives of our invention but also in the solution of the disuccinimide in the polybutene for such compositions are saleable as concentrate additives to others for their own formulations as lubricant oil compositions.

In the Lincoln M.S. Test Sequence V, after the formulated lubricant oil has been tested and the engine disassembled for inspection of the parts thereof for sludge and varnish deposits among other inspections, the total

TABLE II.—PREPARATIONS OF DISUCCINIMIDE NOS. 4 TO 6

| Preparations Number | MA/PB Mole Ratio | Temperature MA-Oil, °F. | Decomposition, Percent MA [1] | Yield PSA, Percent [2] | Pound Mole Ratio, PSA/TEPA | 45% Disuccinimide Solution | | | |
|---|---|---|---|---|---|---|---|---|---|
| | | | | | | Flash, °F. [3] | Viscosity, 210° F. SSU | Acid No. | Nitrogen, Percent |
| 4 | 0.75 | 170 | | 57 | 2 to 1 | 365 | 678 | 3.4 | 1.26 |
| 5 | 0.75 | 250 | 4 | 62 | 2 to 1 | 375 | 541 | 2.6 | 1.25 |
| 6 | 0.85 | 270 | 5 | 68 | 2 to 1 | 370 | 443 | 3.4 | 1.29 |

[1] Based on maleic anhydride charged and determined by considering as decomposed that maleic anhydride not recovered and not in PSA product.
[2] Based on polybutene charged.
[3] "Flash °F." is Cleveland Cup Flash Point temperature in °F.

When the foregoing techniques for reacting polybutenylsuccinic anhydride with tetraethylene pentamine are carried out using a 1 to 1 mole ratio of this polyamine to the substituted succinic anhydride, there is formed in the polybutene solvent a compound which, according to the French Patent 1,265,086, contains characteristic infra-red patterns of one imide group and a polybutenic lateral chain and is identified as a monopolybutenyl succinimide of tetraethylene amine. Such a mono-imide differs chemically from the disuccinimides of the foregoing "Preparation of Disuccinimide—Nos. 1, 2, 3, 4, 5 and 6.

A mineral oil diluent such as SAE 5W, SAE 20 and the like can be added to the polybutene before reaction with maleic anhydride or before reacting the solution of polybutenylsuccinic anhydride with tetraethylene pentamine, there is no particular advantage usually so obtained. In place of the polybutene reactant of 1000 SSU, 210° F. viscosity and average molecular weight of 860, there can be employed, for example, polybutene having an average ebullioscopic molecular weight of 1200 and a viscosity of 3000 SSU at 210° F., a mixture of about 60 weight percent of polybutene of average molecular weight of 2000 and viscosity of 15,000 SSU at 210° F. and about 40 weight percent of a polybutene of average molecular weight of 860 and viscosity of 1000 SSU at 210° F.

The disuccinimide detergent-dispersants prepared as disclosed herein can be used as addition agents in lubricating oils and especially in lubricating oils for use in internal combustion engines as hereinbefore demonstrated. The addition agents impart excellent low temperature dispersancy characteristics of a superior quality to the lubricating oil. Although amounts of the disuccinimide detergent-dispersant agent may be varied as desired, it is believed advantageous to use at least about 0.01 weight percent and up to 20 weight percent of the disuccinimide of this invention and preferably 0.2 to 5 weight percent in a suitable lubricating oil. Although the preferred lubricating oils are the mineral lubricating oils, the use of the disuccinimide additive compositions is not restricted thereto. Other lubricating oil bases can be used, such as hydrocarbon oils, both natural and synthetic, for example, those obtained by the polymerization of olefins, as well as synthetic lubricating oils of the alkylene oxide type and the mono- and poly-carboxylic acid ester type, such as the esters of adipic acid, sebacic acid, azelaic acid. It is also contemplated that various other well-known additives, such as anti-oxidants, antifoam agents, pour point depressors, extreme pressure agents, corrosion inhibitors, anti-wear agents, etc., may be incorporated not only in lubricating oils containing the varnish and sludge ratings are made from the individual ratings of the following engine parts:

*Varnish*

Piston
Rocker arm cover
Push rod cover
Cylinder walls
Oil pan

*Sludge*

Push rod chamber
Rocker arm assembly
Rocker arm cover
Oil screen
Oil pan
Push rod cover
Timing gear cover
Valve deck The varnish and sludge rating for each and every one of the foregoing parts is made. Then an average rating is made for each type of part, for example, the varnish ratings for each of the light pistons are added and divided by 8 for the average piston varnish. The sum of the average ratings for each class of parts is found for both sludge and varnish. The rating of total varnish is the sum of the average ratings of the five classes of parts. A varnish rating of 7.0 or higher for each class of parts is considered to be passing.

The rating of total sludge is the sum of the average ratings for the eight classes of parts multiplied by 5/8 since the perfect total sludge rating is 50. The perfect total varnish rating is also 50.

What is claimed is:

1. A process for the preparation of a lubricant oil detergent additive comprising a solution of about 45 to 50 weight percent $N_1,N_5$-di(polybutenylsuccinimide) of tetraethylene pentamine whose polybutenyl group is derived from polybutene having an average molecular weight of about 860 dissolved in from 55 to 50 weight percent of a solvent comprising a light hydrocarbon oil and polybutene having an average molecular weight of 860 and a viscosity of 1,000 SSU at 210° F., which comprises reacting in an inert gas atmosphere said polybutene with maleic anhydride in a ratio of 0.7 to 0.9 mole maleic anhydride per mole polybutene by heating said polybutene to a temperature in the range of 400 to 475° F., adding molten maleic anhydride at a temperature of from 170 to 425° F. slowly to said polybutene at the rate of from 0.1 to 0.4 mole per hour, maintaining the resulting reaction mixture at a temperature of from 400 to 475° F. for a total of 10 to 24 hours reaction time, thereafter removing unreacted maleic anhydride by distillation and removing maleic anhydride decomposition products having a vapor pressure greater than maleic anhydride by filtration, and diluting said reaction product with a light mineral oil to a concentration of 45 to 60% of the resulting 3 polybutenylsuccinic anhydride, thereafter cooling said solution of polybutenylsuccinic anhydride to a temperature in the range of 200 to 250° F., reacting in an inert gas atmosphere tetraethylene pentamine with said dissolved polybutenylsuccinic anhydride in the ratio of 0.4 to 0.6 mole of said pentamine per mole of polybutenylsuccinic anhydride in solution by the slow addition of said pentamine at a temperature in the range of 200 to 300° F., and removing water of reaction, whereby the product of reaction between said polybutenylsuccinic anhydride and tetraethylene pentamine consists essentially of said $N_1,N_5$-di-(polybutenyl succinimide) of tetraethylene pentamine and diluting said reaction product with light mineral oil to a concentration of from 45 to 50 weight percent, said polybutenyl succinic anhydridetetraethyl pentamine reaction product is characterized by being substantially free from reaction products containing amide groups.

2. A process for the preparation of lubricant oil detergent-dispersant lubricant additive comprising a solution of from about 30 to about 50 weight percent of $N_1,N_5$-di-(polybutenylsuccinimide) of tetraethylene pentamine whose alkenyl group is derived from a polybutene having an average molecular weight of from 500 to 100,000 dissolved in from 50 to 70 weight percent of a solvent consisting of a light hydrocarbon oil and polybutene having an average molecular weight of from 500 to 100,000 and said solution is substantially free from succinic acid amide derivatives of tetraethylene pentamine, which process comprises the slow addition of maleic anhydride at a temperature of from 170 to 425° F. to a polybutene having an average molecular weight in the range of from 500 to 100,000 heated to a temperature in the range of 400 to 475° F. in the ratio of 0.7 to 0.9 mole of maleic anhydride per mole of said polybutene at a ratio of from 0.1 to 0.4 mole per hour maintained in an oxygen-free inert atmosphere, maintaining the mixture at a temperature just below the reflux temperature of maleic anhydride for a total reaction time of 10 to 24 hours, thereafter removing unreacted maleic anhydride and thermal decomposition products having a vapor pressure above that of maleic anhydride whereas 3 polybutenylsuccinic anhydride dissolved in said polybutene forms; diluting said solution with a light hydrocarbon oil to a concentration of said substituted succinic anhydride of from 40 to 50% by weight; cooling said solution of polybutenylsuccinic anhydride to a temperature in the range of from 200 to 250° F. and at this temperature slowly adding to said solution from 0.4 to 0.8 mole of tetraethylene pentamine, maintaining a maximum reaction temperature of about 330° F, and an inert gas atmosphere while removing water of reaction whereat a detergent-dispersant additive solution of said disuccinimide of tetraethylene pentamine is formed, and diluting said solution with light mineral oil to a concentration of said disuccinimide of from 30 to 50 weight percent.

3. The process of claim 2 wherein from 50 to 60 weight percent of the tetraethylene pentamine is first added and heat of reaction is retained to drive off water of reaction and to increase the reaction temperature to 250 to 280° F., thereafter the remaining 40 to 50 weight percent tetraethylene pentamine is added to provide heat of reaction to heat the reaction mixture to 330° F. and to maintain a 330° F. temperature to drive off water of reaction and the resulting reaction mixture is heated under conditions to produce a substantially anhydrous solution.

References Cited by the Examiner

UNITED STATES PATENTS

| 2,525,788 | 10/1950 | Fontana et al. | 252—59 |
| 2,833,721 | 5/1958 | Hilliker et al. | 252—59 X |
| 3,004,987 | 10/1961 | Paris | 252—51.5 X |
| 3,131,150 | 4/1964 | Stuart et al. | 252—51.5 X |
| 3,154,560 | 10/1964 | Osuch | 252—51.5 X |

FOREIGN PATENTS

| 1,265,086 | 5/1961 | France. |

DANIEL E. WYMAN, *Primary Examiner.*

P. P. GARVIN, *Assistant Examiner.*